US012668066B2

(12) United States Patent
Hara

(10) Patent No.: US 12,668,066 B2
(45) Date of Patent: Jun. 30, 2026

(54) IMAGE FORMATION METHOD AND INKJET RECORDING APPARATUS

(71) Applicant: KYOCERA Document Solutions Inc., Osaka (JP)

(72) Inventor: Miyuki Hara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 183 days.

(21) Appl. No.: 18/598,766

(22) Filed: Mar. 7, 2024

(65) Prior Publication Data

US 2024/0300247 A1 Sep. 12, 2024

(30) Foreign Application Priority Data

Mar. 9, 2023 (JP) ................................ 2023-036533

(51) Int. Cl.

| | |
|---|---|
| ***B41J 2/21*** | (2006.01) |
| ***B41J 2/15*** | (2006.01) |
| ***B41J 2/155*** | (2006.01) |
| ***B41J 11/00*** | (2006.01) |

(52) U.S. Cl.

CPC ............ *B41J 2/2114* (2013.01); *B41J 2/155* (2013.01); *B41J 2/2117* (2013.01); *B41J 11/0022* (2021.01); *B41J 11/007* (2013.01)

(58) Field of Classification Search

CPC ........ B41J 2/2114; B41J 2/155; B41J 2/2117; B41J 11/0022; B41J 11/007; C09D 11/38; C09D 11/40; C09D 11/54

See application file for complete search history.

(56) References Cited

U.S. PATENT DOCUMENTS

| | | | | |
|---|---|---|---|---|
| 2019/0092954 A1* | 3/2019 | Nishiura | .............. | C09D 11/106 |
| 2023/0220226 A1* | 7/2023 | Hagiwara | ............ | C09D 11/322 106/31.89 |

FOREIGN PATENT DOCUMENTS

| | | |
|---|---|---|
| JP | 2015-093954 A | 5/2015 |

* cited by examiner

*Primary Examiner* — Jason S Uhlenhake

(74) *Attorney, Agent, or Firm* — Studebaker Brackett PLLC

(57) ABSTRACT

An image formation method includes: applying a white ink onto an image formation area of a non-absorbent recording medium; performing image formation with a color ink on the image formation area of the non-absorbent recording medium; and drying the white ink and the color ink. The white ink contains a white pigment, a first aqueous medium, and first binder resin particles containing a first resin. The color ink contains a color pigment, a second aqueous medium, and second binder resin particles containing a second resin. Both the first binder resin particles and the second binder resin particles include identical resin particles. The first resin and the second resin each have a glass transition temperature of at least 40° C. and no greater than 80° C.

7 Claims, 1 Drawing Sheet

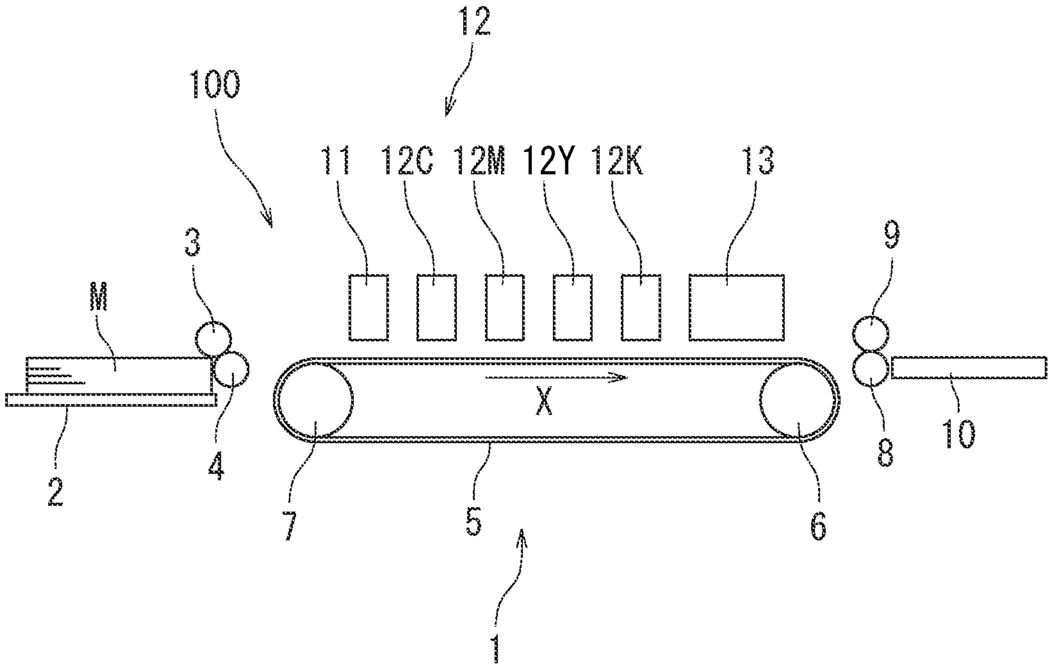
12
100
11
12C
12M
12Y
12K
13
3
M
9
X
2
4
7
5
6
8
10
1

IMAGE FORMATION METHOD AND INKJET RECORDING APPARATUS

INCORPORATION BY REFERENCE

The present application claims priority under 35 U.S.C. § 119 to Japanese Patent Application No. 2023-036533, filed on Mar. 9, 2023. The contents of this application are incorporated herein by reference in their entirety.

BACKGROUND

The present disclosure relates to an image formation method and an inkjet recording apparatus.

Typically, recording media such as flexible packaging (e.g., resin film) used in image formation methods are transparent. When printing on such a transparent recording medium with a typical color ink, opacity of formed images may not be sufficient and the printed portion may be difficult to see. In order to ensure opacity of images formed by an image formation method on such flexible packaging, an underlying layer may be formed with a white ink followed by formation of an image layer exhibiting a desired image with the color ink on the underlying layer. In the above image formation method, the formed image (a layered product of the underlying layer and the image layer) is likely to be peeled off from the recording medium. Furthermore, it is difficult to fix the color ink to a desired location on the underlying layer in the above image formation method. Therefore, it is crucial in the above image forming method to ensure adhesion of the formed image to the recording medium and pinning of the color ink. Note that the term pinning refers to the performance of fixing ink to desired locations.

Glossy recording media are typically used in the image formation method on flexible packaging. In the image formation method on a glossy recording medium such as above, it is desirable to add gloss to formed images in order to avoid the feeling of discomfort of a printed portion. Therefore, the image formation method on flexible packaging needs to achieve formation of images with excellent gloss. To meet such demands, an image formation method was proposed for example that uses an inkjet ink composition containing water and polymer particles that satisfy a specific condition.

SUMMARY

An image formation method according to an aspect of the present disclosure includes: applying a white ink onto an image formation area of a non-absorbent recording medium; performing image formation with a color ink on the image formation area of the non-absorbent recording medium; and drying the white ink and the color ink. The white ink contains a white pigment, a first aqueous medium, and first binder resin particles containing a first resin. The color ink contains a color pigment, a second aqueous medium, and second binder resin particles containing a second resin. Both the first binder resin particles and the second binder resin particles include identical resin particles. The first resin and the second resin each have a glass transition temperature of at least 40° C. and no greater than 80° C. The color ink has a surface tension $ST_C$ greater than a surface tension $ST_W$ of the white ink. A difference between the surface tension $ST_C$ of the color ink and the surface tension $ST_W$ of the white ink is at least 0.5 mN/m and no greater than 10.0 mN/m. A drying temperature in the drying is at least the glass transition temperature of each of the first resin and the second resin and no greater than 135° C. A drying time in the drying is at least 3 seconds and no greater than 125 seconds.

An inkjet recording apparatus according to another aspect of the present disclosure includes: a conveyance section that coneys a non-absorbent recording medium; lineheads that perform image formation on the non-absorbent recording medium; and a drying section that dries the non-absorbent recording medium after the image formation. The lineheads include: a white ink head that ejects a white ink onto an image formation area of the non-absorbent recording medium; and a recording head that is located downstream of the white ink head in terms of a conveyance direction of the non-absorbent recording medium and that performs the image formation with a color ink on the image formation area of the non-absorbent recording medium. The white ink contains a white pigment, a first aqueous medium, and first binder resin particles containing a first resin. The color ink contains a color pigment, a second aqueous medium, and second binder resin particles containing a second resin. Both the first binder resin particles and the second binder resin particles include identical resin particles. The first resin and the second resin each have a glass transition temperature of at least 40° C. and no greater than 80° C. The color ink has a surface tension $ST_C$ greater than a surface tension $ST_W$ of the white ink. A difference between the surface tension $ST_C$ of the color ink and the surface tension $ST_W$ of the white ink is at least 0.5 mN/m and no greater than 10.0 mN/m. A drying temperature in the drying section is at least the glass transition temperature of each of the first resin and the second resin and no greater than 135° C. A drying time in the drying section is at least 3 seconds and no greater than 125 seconds.

BRIEF DESCRIPTION OF THE DRAWINGS

The FIGURE is a diagram illustrating main elements of an inkjet recording apparatus according to a second embodiment of the present disclosure.

DETAILED DESCRIPTION

The following describes embodiments of the present disclosure. Note that measurement values for surface tension are values as measured in accordance with the Wilhelmy method (plate method) at 25° C. using a surface tensiometer (e.g., "DY-300", product of Kyowa Interface Science Co., Ltd., automatic surface tensiometer).

The measurement values for glass transition temperature (Tg) are values as measured in accordance with "Japanese Industrial Standards (JIS) K7121-2012" using a differential scanning calorimeter (e.g., "DSC-60", product of Shimazu Corporation) unless otherwise stated. The glass transition temperature (Tg) corresponds to the temperature corresponding to a point (specifically, an intersection point of an extrapolated baseline and an extrapolated falling line) of inflection caused by glass transition on a heat absorption curve (vertical axis: heat flow (DSC signal), horizontal axis: temperature, heating rate: 5° C./min) plotted using the differential scanning calorimeter.

Unless otherwise stated, the number average particle diameter of a powder is a number average value of equivalent circle diameters (Heywood diameters: diameters of circles having the same areas as projected areas of primary particles) of primary particles of the powder as measured using a scanning electron microscope. The number average primary particle diameter of a powder is a number average value of equivalent circle diameters of 100 primary particles of the powder, for example. Unless otherwise stated, the number average primary particle diameter of particles refers to the number average primary particle diameter of the particles of a powder.

In the present specification, the term "(meth)acryl" may be used as a generic term for both acryl and methacryl. Unless otherwise stated, one type of each component described in the present specification may be used independently, or two or more types of the component may be used in combination.

First Embodiment: Image Formation Method

An image formation method according to a first embodiment of the present disclosure includes: a white ink application process of applying a white ink onto an image formation area of a non-absorbent recording medium; an image formation process of performing image formation with a color ink on the image formation area of the non-absorbent recording medium; and a drying process of drying the white ink and the color ink. The white ink contains a white pigment, a first aqueous medium, and first binder resin particles containing a first resin. The color ink contains a color pigment, a second aqueous medium, and second binder resin particles containing a second resin. Both the first binder resin particles and the second binder resin particles include identical resin particles. The first resin and the second resin each have a glass transition temperature of at least 40° C. and no greater than 80° C. The color ink has a surface tension $ST_C$ greater than a surface tension $ST_W$ of the white ink. The difference between the surface tension $ST_C$ of the color ink and the surface tension $ST_W$ of the white ink is at least 0.5 mN/m and no greater than 10.0 mN/m. The drying temperature in the drying is at least the glass transition temperature of each of the first resin and the second resin and no greater than 135° C. The drying time in the drying is at least 3 seconds and no greater than 125 seconds. The image formation method of the present disclosure can be implemented through use of the later-described inkjet recording apparatus according to a second embodiment, for example.

The image formation method of the present disclosure is suitable for image formation on non-absorbent recording media (particularly, flexible packaging). The non-absorbent recording media are inferior to absorbent recording media in absorbency for aqueous media (first aqueous medium and second aqueous medium). A non-absorbent recording medium has an absorption amount for aqueous media of no greater than 1.0 $g/m^2$, for example. Examples of the non-absorbent recording media include resin-made recording media, metal-made recording media, and glass-made recording media. Examples of the resin-made recording media include resin sheets and resin films. The resin contained in the resin-made recording media is preferably a thermoplastic resin. Specific examples of the resin include polyethylene, polypropylene, polyvinyl chloride, and polyethylene terephthalate (PET). Examples of the resin-made recording media include OPP films or PET films. In a situation in which image formation is performed on a resin-made recording medium by the image formation method of the present disclosure, the surface (printing surface) of the recording medium may be subjected to corona discharge treatment.

The image formation method of the present disclosure is preferably used in front printing. Here, the front printing, when printing on a transparent recording medium, means printing on the front side (the side that is visible to viewers) of the transparent recording medium. When viewers view a recording medium on which front printing has been done, the positional relationship "the viewers, an image, and the recording medium" is established and the image is directly viewed by the viewers. As such, images formed by front printing tend to require particularly high gloss.

Note that when printing on a transparent recording medium, printing on the back side (the side opposite to the side that is visible to viewers) of the transparent recording medium refers to reverse printing. When the viewers view a recording medium on which reverse printing has been done, the positional relationship "the viewers, the recording medium, and an image" is established and the image is viewed by the viewers through the recording medium. Therefore, images formed by reverse printing tend not to require very high gloss.

With the aforementioned features, images with excellent color ink pinning, as well as excellent gloss and adhesion to recording media can be formed by the image formation method of the present disclosure. The reasons why the image formation method of the present disclosure can offer the above advantages are inferred as follows. The image formation method of the present disclosure uses a white ink for use in formation of underlying layers and a color ink for use in formation of image layers on the underlying layers. Both the white ink and the color ink contain identical binder resin particles (the first binder resin particles and the second binder resin particles, respectively). As such, the underlying layers and the image layers after image formation have high affinity with each other and exhibit excellent inter-layer adhesion. The glass transition temperature is moderately low (no greater than 80° C.) of the binder resins (first resin and second resin) contained in the binder resin particles of the white ink and the color ink. Furthermore, in the image formation method of the present disclosure, the white ink and the color ink are heated at a temperature equal to or greater than the aforementioned glass transition temperature for a specific time or longer in the drying process. This sufficiently softens the first binder resin particles and the second binder resin particles in the drying process to ensure adhesion of underlying layers to recording media and adhesion of image layers to the underlying layers. As a result, images with excellent adhesion to recording media can be formed by the image formation method of the present disclosure. Furthermore, the first binder resin particles and the second binder resin particles are sufficiently softened in the drying process as described above. As a result, images with fairly smooth surfaces and excellent gloss can be formed by the image formation method of the present disclosure.

The surface tension $ST_C$ of the color ink is higher than the surface tension $ST_W$ of the white ink in the image formation method of the present disclosure. Specifically, the difference between the surface tension $ST_C$ of the color ink and the surface tension $ST_W$ of the white ink is at least 0.5 mN/m and no greater than 10.0 mN/m. As such, mixing of the white ink and the color ink during formation of an image layer on an underlying layer can be inhibited by setting the surface tension $ST_C$ of the color ink slightly higher than the surface tension $ST_W$ of the white ink. As a result, excellent pinning of the color ink can be achieved in the image formation method of the present disclosure because the color ink can be fixed to a desired location on the underlying layer.

By contrast, in a case in which the glass transition temperatures of the binder resins contained in the binder resin particles of the white ink and the color ink are extremely low (e.g., less than 40° C.), the binder resin particles may agglomerate before use of the white ink and the color ink to make it difficult to fix the white ink and the color ink to desired locations. In addition, in a case in which the drying temperature or the drying time in the drying process are extreme (e.g., when the drying temperature is greater than 135° C. or the drying time is greater than 125 seconds), recording media themselves may be warped, resulting in a decrease in color ink pinning and gloss of formed image. In the image formation method of the present disclosure by contrast, the glass transition temperature of each binder resin is set to at least 40° C., the drying temperature in the drying process is set to no greater than 135° C., and the drying time in the drying process is set to no greater than 125 seconds. As a result, excellent color ink pinning and excellent gloss of the formed images can be maintained according to the image formation method of the present disclosure.

The term "identical resin particles" herein means fulfilment of all of the following conditions (1) to (3). However, taking into account measurement errors and other factors, deviation within ±3% are acceptable for the "number average primary particle diameter", "mass average molecular weight", and "percentage content", as long as the intent of the present disclosure is not compromised. The numerical variations are preferably within ±1%, and more preferably 0%.

(1) The first binder resin particles and the second binder resin particles have the same number average primary particle diameter.
(2) Both the first resin and the second resin are of the same type of resin. The terms same type of resin refers to the condition where the mass average molecular weights of the resins, as well as the types and percentage contents of repeating units in the resins, are the same. That is, the mass average molecular weights of the first resin and the second resin are the same. Also, the percentage contents of specific repeating units in the first resin and the second resin are the same.
(3) The percentage contents of the resins (first resin and second resin) in the first binder resin particles and the second binder resin particles are the same. When both the first binder resin particles and the second binder resin particles further contain an additional component other than the first resin and the second resin, the percentage contents of the additional component in the first binder resin particles and the second binder resin particles are the same.

Details of the image formation method of the present disclosure are further described below. The white ink and the color ink used in the image formation method of the present disclosure are described first.

[White Ink]

The white ink contains a white pigment, a first aqueous medium, and first binder resin particles containing a first resin. The white ink has a surface tension $ST_W$ of preferably at least 20.00 mN/m and no greater than 24.00 mN/m, more preferably at least 22.00 mN/m and no greater than 23.50 mN/m, and further preferably at least 23.00 mN/m and no greater than 23.50 mN/m.

(White Pigment)

The white pigment in the white ink constitutes white pigment particles together with a pigment coating resin, for example. The white pigment particles are each constituted by a core containing the white pigment and the pigment coating resin covering the core, for example. The white pigment particles are present in a dispersed state in the first aqueous medium, for example.

Examples of the white pigment include zinc white, titanium oxide, antimony white, zinc sulfide, barite powder, barium carbonate, clay, silica, white carbon, talc, calcium carbonate, mica, kaolin, and alumina white. Titanium oxide is preferable as the white pigment.

The white pigment has a number average primary particle diameter of preferably at least 10 nm and no greater than 200 nm, and more preferably at least 20 nm and no greater than 40 nm. As a result of the number average primary particle diameter of the white pigment being set to at least 10 nm, the image formation method of the present disclosure can impart excellent whiteness and opacity to formed images. As a result of the number average primary particle diameter of the white pigment being set to no greater than 200 nm, excellent preservation stability can be imparted to the white ink.

The white pigment preferably have a flat shape rather than a spherical shape. Underlying layers formed with such a flat-shaped white pigment have a fairly smooth surface and tends to readily exhibit further excellent gloss. Specifically, the ratio of the major axis length to the minor axis length of the white pigment is preferably at least 2 and no greater than 20, and more preferably at least 3 and no greater than 7. As a result of the ratio of the major axis length to the minor axis length of the white pigment being set to at least 2, further excellent gloss can be imparted to images formed by the image formation method of the present disclosure. As a result of the ratio of the major axis length to the minor axis length of the white pigment being set to no greater than 20, excellent preservation stability can be imparted to the white ink.

The white pigment has a percentage content of preferably at least 3.0% by mass and no greater than 15.0% by mass in the white ink, and more preferably at least 5.0% by mass and no greater than 10.0% by mass. As a result of the percentage content of the white pigment being set to at least 3.0% by mass in the white ink, excellent opacity can be imparted to images formed by the image formation method of the present disclosure. As a result of the percentage content of the white pigment being set to no greater than 15.0% by mass in the white ink, excellent preservation stability can be imparted to the white ink.

(Pigment Coating Resin)

The pigment coating resin in the white ink is a resin soluble in the first aqueous medium. A portion of the pigment coating resin is present on the surfaces of the white pigment particles to optimize dispersibility of the white pigment particles. Another portion of the pigment coating resin is present in a dissolved state in the first aqueous medium. Examples of the pigment coating resin include (meth)acrylic resin, styrene-(meth)acrylic resin, and styrene-maleic acid resin.

The pigment coating resin has a percentage content of preferably at least 0.5% by mass and no greater than 8.0% by mass in the white ink, and more preferably at least 1.0% by mass and no greater than 3.0% by mass. As a result of the percentage content of the pigment coating resin being set to at least 0.5% by mass, dispersion stability of the white pigment can be optimized. As a result of the percentage content of the pigment coating resin being set to no greater than 8.0% by mass, excellent ejectability can be imparted to the white ink.

(First Binder Resin Particles)

The first binder resin particles are present in a dispersed state in the first aqueous medium. The first binder resin particles function as a binder in underlying layers to optimize fixability of the white pigment to recording media.

The first binder resin particles have a number average primary particle diameter of preferably at least 5 nm and no greater than 200 nm, and more preferably at least 8 nm and no greater than 50 nm.

The first binder resin particles contain a first resin. Examples of the first resin include urethane resin, (meth) acrylic resin, styrene-(meth)acrylic resin, styrene-maleic copolymers, vinylnaphthalene-(meth)acrylic acid copolymers, and acid vinylnaphthalene-maleic acid copolymers. The first resin is preferably urethane resin. The urethane resin has a percentage content of preferably at least 80% by mass in the first binder resin particles, and more preferably 100% by mass.

The first binder resin particles have a percentage content of preferably at least 0.5% by mass and no greater than 10.0% by mass in the white ink, and more preferably at least 2.0% by mass and no greater than 4.0% by mass. As a result of the percentage content of the first binder resin particles being set to at least 0.5% by mass, adhesion of underlying layers to recording media can be further optimized. As a result of the percentage content of the first binder resin particles being set to no greater than 10.0% by mass, ejection stability of the white ink can be optimized.

(First Aqueous Medium)

The white ink contains a first aqueous medium. The first aqueous medium is a medium containing water. The first aqueous medium may function as a solvent or a dispersion medium. A specific example of the first aqueous medium is an aqueous medium containing water and a water-soluble organic solvent.

(Water)

The water has a percentage content of preferably at least 25.0% by mass and no greater than 80.0% by mass in the white ink, and more preferably at least 40.0% by mass and no greater than 60.0% by mass.

(Water-Soluble Organic Solvent)

Examples of the water-soluble organic solvent include glycol compounds, glycol ether compounds, lactam compounds, nitrogen-containing compounds, acetate compounds, thiodiglycol, glycerin, and dimethyl sulfoxide.

Examples of the glycol compounds include ethylene glycol, 1,3-propanediol, propylene glycol, 1,2-pentanediol, 1,5-pentanediol, 1,2-octanediol, 1,8-octanediol, 3-methyl-1, 3-butanediol, 3-methyl-1,5-pentanediol, diethylene glycol, triethylene glycol, and tetraethylene glycol. A preferable glycol compound is propylene glycol.

Examples of the glycol ether compounds include diethylene glycol diethyl ether (diethyl diglycol), diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether (butyl triglycol), and propylene glycol monomethyl ether. A preferable glycol ether compound is butyl triglycol.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The water-soluble organic solvent is preferably a glycol compound or a glycol ether compound, and more preferably propylene glycol or butyl triglycol.

The water-soluble organic solvent has a percentage content of preferably at least 15.0% by mass and no greater than 50.0% by mass in the white ink, and more preferably at least 25.0% by mass and no greater than 40.0% by mass.

The glycol compound has a percentage content of preferably at least 10.0% by mass and no greater than 50.0% by mass in the white ink, and more preferably at least 20.0% by mass and no greater than 30.0% by mass.

The glycol ether compound has a percentage content of preferably at least 2.0% by mass and no greater than 15.0% by mass in the white ink, and more preferably at least 6.0% by mass and no greater than 10.0% by mass.

Preferably, the white ink contains as the first aqueous medium only water, propylene glycol, and butyl triglycol. The total percentage content of the water, propylene glycol, and butyl triglycol is preferably at least 90% by mass in the first aqueous medium, more preferably at least 99% by mass, and further preferably 100% by mass.

(Surfactant)

Preferably, the white ink further contains a surfactant. The surfactant optimizes compatibility and dispersion stability of the components contained in the white ink. The surfactant also optimizes wettability of the white ink to recording media. The surfactant in the white ink is preferably a nonionic surfactant.

Examples of the nonionic surfactant include acetylene glycol surfactants (surfactants containing an acetylene glycol compound), silicone surfactants (surfactants containing a silicone compound), and fluorine surfactants (surfactants containing fluororesin or a fluorine-containing compound). Examples of the acetylene glycol surfactants include ethylene oxide adducts of acetylene glycol and propylene oxide adducts of acetylene glycol. The nonionic surfactant is preferably a silicone surfactant.

The surfactant has a percentage content of preferably at least 0.1% by mass and no greater than 2.0% by mass in the white ink, and more preferably at least 0.3% by mass and no greater than 0.6% by mass. As a result of the percentage content of the surfactant in the white ink being set to a value within the above range, desired surface tension can be imparted to the white ink.

(Additional Components)

The white ink may further contain any known additives (specific examples include a solution stabilizer, an anti-drying agent, an antioxidant, a viscosity modifier, a pH adjuster, or an antifungal agent) as necessary.

(White Ink Production Method)

The white ink can be produced by mixing a dispersion containing the white pigment, the first aqueous medium, a dispersion containing the first binder resin particles, and any additional component (e.g., the surfactant) added as necessary, for example. In white ink production, uniform mixing of the components may be followed by removal of foreign matter and coarse particles using a filter (e.g., a filter with a pore size of no greater than 5 μm).

[Color Ink]

The color ink contains a color pigment, a second aqueous medium, and second binder resin particles containing a second resin. Note that a plurality of color inks (e.g., a cyan ink, a magenta ink, a yellow ink, and a black ink) are typically used in the image formation method of the present disclosure. In this case, each of the color inks has the aforementioned features.

The color ink has a surface tension $ST_C$ of preferably at least 23.00 mN/m and no greater than 35.00 mN/m, more preferably at least 23.50 mN/m and no greater than 26.00 mN/m, and further preferably at least 24.00 mN/m and no greater than 25.00 mN/m.

The surface tension $ST_C$ of the color ink is greater than the surface tension $ST_W$ of the white ink. The difference between the surface tension $ST_C$ of the color ink and the surface tension $ST_W$ of the white ink is at least 0.5 mN/m and no greater than 10.0 mN/m, preferably at least 1.0 mN/m and no greater than 3.0 mN/m, and more preferably at least 1.5 mN/m and no greater than 2.0 mN/m. As a result of the difference between the surface tension $ST_C$ of the color ink and the surface tension $ST_W$ of the white ink being set to at least 0.5 mN/m, the color ink constituting an image layer can be inhibited from being assimilated into an underlying layer. As a result of the difference between the surface tension $ST_C$ of the color ink and the surface tension $ST_W$ of the white ink being set to no greater than 10.0 mN/m, the white ink constituting the underlying layer can be inhibited from being assimilated into the image layer.

(Color Pigment)

The color pigment is a pigment (non-white pigment) other than white pigments. The color pigment in the color ink constitutes color pigment particles together with a pigment coating resin, for example. The color pigment particles are each constituted by a core containing the color pigment and the pigment coating resin covering the core. The color pigment particles are present in a dispersed state in the second aqueous medium, for example.

Examples of the color pigment include yellow pigments, orange pigments, red pigments, blue pigments, violet pigments, and black pigments. Examples of the yellow pigments include C.I. Pigment Yellow (74, 93, 95, 109, 110, 120, 128, 138, 139, 151, 154, 155, 173, 180, 185, or 193). Examples of the orange pigments include C.I. Pigment Orange (34, 36, 43, 61, 63, or 71). Examples of the red pigments include C.I. Pigment Red (122 or 202). Examples of the blue pigments include C.I. Pigment Blue (15, more specifically 15:3). Examples of the violet pigments include C.I. Pigment Violet (19, 23, or 33). Examples of the black pigments include C.I. Pigment Black (7).

The color pigment has a number average primary particle diameter of preferably at least 10 nm and no greater than 200 nm, and more preferably at least 20 nm and no greater than 40 nm. As a result of the number average primary particle diameter of the color pigment being set to at least 10 nm, images with desired image density can be easily formed by the image formation method of the present disclosure. As a result of the number average primary particle diameter of the color pigment being set to no greater than 200 nm, excellent preservation stability can be imparted to the color ink.

The color pigment has a percentage content of preferably at least 3.0% by mass and no greater than 20.0% by mass in the color ink, and more preferably at least 6.0% by mass and no greater than 12.0% by mass. As a result of the percentage content of the color pigment being set to at least 3.0% by mass, images with desired image density can be easily formed with the color ink. As a result of the percentage content of the color pigment being set to no greater than 20.0% by mass, ejection stability of the color ink can be optimized.

(Pigment Coating Resin)

The pigment coating resin in the color ink is a resin soluble in the second aqueous medium. A portion of the pigment coating resin is present on the surfaces of the color pigment particles to optimize dispersibility of the color pigment particles. Another portion of the pigment coating resin is present in a dissolved state in the second aqueous medium, for example.

The pigment coating resin is preferably styrene-(meth)acrylic resin. The styrene-(meth)acrylic resin includes a styrene unit and a repeating unit derived from at least one monomer of (meth)acrylic acid alkyl ester and (meth)acrylic acid. Examples of the (meth)acrylic acid alkyl ester include methyl (meth)acrylate, ethyl (meth)acrylate, propyl (meth) acrylate, and butyl (meth)acrylate. The styrene-(meth) acrylic resin is preferably a copolymer of styrene, methyl methacrylate, methacrylic acid, and butyl acrylate.

The pigment coating resin has a percentage content of preferably at least 0.1% by mass and no greater than 4.0% by mass in the color ink, and more preferably at least 0.5% by mass and no greater than 1.5% by mass. As a result of the percentage content of the pigment coating resin being set to at least 0.1% by mass and no greater than 4.0% by mass, ejection stability of the color ink can be ensured.

(Second Binder Resin Particles)

The second binder resin particles are present in a dispersed state in the second aqueous medium. The second binder resin particles function as a binder in image layers to optimize fixability of the color pigment to underlying layers.

Note that both the first binder resin particles and the second binder resin particles include identical resin particles. As such, the number average primary particle diameter of the second binder resin particles is the same as the number average primary particle diameter of the first binder resin particles.

The second binder resin particles contain a second resin. Both the first resin contained in the first binder resin particles and the second resin contained in the second binder resin particles are of the same type of resin. As such, details of the second resin are the same as the details of the first resin and duplicate description is therefore omitted. It is preferable that each of the first resin and the second resin is urethane resin.

The first resin and the second resin have the same glass transition temperature. The glass transition temperature of each of the first resin and the second resin is at least 40° C. and no greater than 80° C., and preferably at least 65° C. and no greater than 78° C. As a result of the glass transition temperature of each of the first resin and the second resin being set to at least 40° C., ejection stability of the white ink and the color ink can be optimized. As a result of the glass transition temperature of each of the first resin and the second resin being set to no greater than 80° C., images formed by the image formation method of the present disclosure can be optimized in gloss of and adhesion to recording media.

(Second Aqueous Medium)

The color ink contains a second aqueous medium. The second aqueous medium is a medium containing water. The second aqueous medium may function as a solvent or a dispersion medium. Details of the second aqueous medium can be the same as those of the first aqueous medium, and duplicate description is therefore omitted. Preferably, the first aqueous medium and the second aqueous medium have the same composition. It is also preferable that the percentage content of the first aqueous medium in the white ink and the percentage content of the second aqueous medium in the color ink are the same.

(Surfactant)

Preferably, the color ink further contain a surfactant. The surfactant optimizes compatibility and dispersion stability of the components contained in the color ink. Details of the surfactant contained in the color ink can be the same as those of the surfactant contained in the white ink, and duplicate description is therefore omitted. Preferably, the color ink and the white ink contain the same surfactant.

The surfactant has a percentage content of preferably at least 0.01% by mass and no greater than 0.50% by mass in the color ink, more preferably at least 0.05% by mass and no greater than 0.30% by mass, and further preferably at least 0.08 and no greater than 0.15% by mass. As a result of the percentage content of the surfactant in the color ink being set to a value within the above range, surface tension of the color ink can be easily optimized.

(Additional Components)

The color ink may further contain any known additives (specific examples include a solution stabilizer, an anti-drying agent, an antioxidant, a viscosity modifier, a pH adjuster, or an antifungal agent) as necessary.

(Color Ink Production Method)

The color ink can be produced by mixing a dispersion containing the color pigment, the second aqueous medium, a dispersion containing the second binder resin particles, and any additional component (e.g., the surfactant) added as necessary, for example. In color ink production, uniform mixing of the components may be followed by removal of foreign matter and coarse particles using a filter (e.g., a filter with a pore size of no greater than 5 μm).

[White Ink Application Process]

In the present process, the white ink is applied onto an image formation area of a non-absorbent recording medium. As a result, an underlying layer is formed on the image formation area of the non-absorbent recording medium. In the white ink application process, the white ink is applied onto the image formation area of the non-absorbent recording medium preferably by ink jetting.

[Image Formation Process]

In the present process, image formation with the color ink is performed on the image formation area (i.e., the underlying layer) of the non-absorbent recording medium. As a result, an image layer is formed on the underlying layer. In the image formation process, image formation with the color ink is performed on the image formation area of the non-absorbent recording medium preferably by ink jetting.

The interval from completion of the white ink application process to completion of the image formation process is preferably no greater than 10 seconds, and more preferably no greater than 5 seconds. As a result of the interval from completion of the white ink application process to completion of the image formation process being set short, printing speed can be optimized in the image formation method of the present disclosure. Note that the image formation is performed typically with a plurality of color inks in the image formation process. In this case, the "interval from completion of the white ink application process to completion of the image formation process" refers to an interval from completion of the white ink application process to completion of image formation with all the color inks.

[Drying Process]

In the present process, the white ink and the color ink are dried. In this manner, the non-absorbent recoding medium with the image formed thereon is dried. Examples of a method for drying the white ink and the color ink include hot air blowing toward the surface of the non-absorbent recording medium after image formation and placing the non-absorbent recording medium after image formation onto a member heated to a desired temperature.

The drying temperature in the drying process is at least the glass transition temperature of each of the first resin and the second resin and no greater than 135° C., and preferably at least 78° C. and no greater than 100° C. As a result of the drying temperature being set to at least the glass transition temperature of each of the first resin and the second resin, color ink pinning in the image formation method of the present disclosure and gloss of formed images can be optimized. As a result of the drying temperature being set to no greater than 135° C., the non-absorbent recording medium can be inhibited from being warped.

The drying time in the drying process is at least 3 seconds and no greater than 125 seconds, preferably at least 3 seconds and no greater than 30 seconds, and more preferably at least 4 seconds and no greater than 10 seconds. As a result of the drying time being set to at least 3 seconds, color ink pinning in the image formation method of the present disclosure and gloss of formed images can be optimized. As a result of the drying time being set to no greater than 125 seconds, the non-absorbent recording medium can be inhibited from being warped.

Second Embodiment: Inkjet Recording Apparatus

An inkjet recording apparatus according to a second embodiment of the present disclosure includes a conveyance section that coneys a non-absorbent recording medium, lineheads that perform image formation on the non-absorbent recording medium, and a drying section that dries the non-absorbent recording medium after the image formation. The lineheads include a white ink head that ejects a white ink onto an image formation area of the non-absorbent recording medium and a recording head that is located downstream of the white ink head in terms of a conveyance direction of the non-absorbent recording medium and that performs the image formation with a color ink on the image formation area of the non-absorbent recording medium. The white ink contains a white pigment, a first aqueous medium, and first binder resin particles containing a first resin. The color ink contains a color pigment, a second aqueous medium, and second binder resin particles containing a second resin. Both the first binder resin particles and the second binder resin particles include identical resin particles. The first resin and the second resin each have a glass transition temperature of at least 40° C. and no greater than 80° C. The color ink has a surface tension $ST_C$ greater than a surface tension $ST_W$ of the white ink. The difference between the surface tension $ST_C$ of the color ink and the surface tension $ST_W$ of the white ink is at least 0.5 mN/m and no greater than 10.0 mN/m. The drying temperature in the drying section is at least the glass transition temperature of each of the first resin and the second resin and no greater than 135° C. A drying time in the drying section is at least 3 seconds and no greater than 125 seconds.

The inkjet recording apparatus of the present disclosure is suitable for implementation of the image formation method according to the first embodiment. The white ink and the color ink used in the inkjet recording apparatus of the present disclosure can be respectively the same as the white ink and the color ink described in the first embodiment, and duplicate description is therefore omitted.

With reference to the accompanying drawing, the inkjet recording apparatus of the present disclosure is described below. The drawing schematically illustrates elements of configuration in order to facilitate understanding. Properties such as the size and number of the elements of configuration illustrated in the drawing may differ from actual ones thereof in order to facilitate preparation of the drawing.

The FIGURE is a diagram illustrating main elements of an inkjet recording apparatus 100 which is an example of the inkjet recording apparatus of the present disclosure. As illustrated in the FIGURE, the inkjet recording apparatus 100 mainly includes a conveyance section 1, lineheads, and a drying section 13. The lineheads include a white ink head 11 and recording heads 12. The inkjet recording apparatus 100 further includes a sheet feed tray 2, a sheet feed roller 3, a sheet feed driven roller 4, a conveyor belt 5, a belt drive roller 6, a belt driven roller 7, an ejection roller 8, an ejection driven roller 9, and an exit tray 10. The conveyor belt 5, the belt drive roller 6, and the belt driven roller 7 constitute a part of the conveyance section 1. The sheet feed tray 2 is provided at the left end in the inkjet recording apparatus 100 in the FIGURE. The sheet feed tray 2 accommodates non-absorbent recording medium sheets M. The sheet feed roller 3 and the sheet feed driven roller 4 are provided at one end of the sheet feed tray 2. The sheet feed roller 3 picks up the accommodated sheets of the non-absorbent recording medium sheet M one by one sequentially from the uppermost one of the sheets to feed and convey the non-absorbent recording medium sheet M to the conveyor belt 5. The sheet feed driven roller 4 is pressed against the sheet feed roller 3 to be rotationally driven.

The conveyor belt 5 is provided in a rotatable manner downstream of the sheet feed roller 3 and the sheet feed driven roller 4 in terms of a conveyance direction of the non-absorbent recording medium sheet M (also referred to below simply as a conveyance direction, rightward in the FIGURE). The conveyor belt 5 is wound between the belt drive roller 6 and the belt driven roller 7. The belt drive roller 6 is provided downstream of the belt driven roller 7 in terms of the conveyance direction. The belt drive roller 6 drives the conveyor belt 5. The belt driven roller 7 is provided upstream of the belt drive roller 6 in terms of the conveyance direction. The belt driven roller 7 is rotationally driven following the belt drive roller 6 through the conveyor belt 5. When the belt drive roller 6 is rotationally driven in the clockwise direction in the FIGURE, the non-absorbent recording medium sheet M is conveyed in a conveyance direction X indicated by the arrow in the FIGURE.

The ejection roller 8 and the ejection driven roller 9 are provided downstream of the conveyor belt 5 in terms of the conveyance direction. The ejection roller 8 is rotationally driven in the clockwise direction in the drawing to eject the non-absorbent recording medium sheet M with an image formed thereon out of the apparatus casing. The ejection driven roller 9 is pressed against the upper part of the ejection roller 8 to be rotationally driven. The exit tray 10 is provided downstream of the ejection roller 8 and the ejection driven roller 9 in terms of the conveyance direction. The non-absorbent recording medium sheet M ejected out of the apparatus casing is placed on the exit tray 10.

The white ink head 11 is provided above the conveyor belt 5. The white ink head 11 ejects a white ink onto an image formation area of the non-absorbent recording medium sheet M conveyed on the conveyor belt 5. In the manner described above, the white ink head 11 forms an underlying layer on the image formation area of the non-absorbent recording medium sheet M.

The recording heads 12 are provided downstream of the white ink head 11 in terms of the conveyance direction. The recording heads 12 include recording heads 12C, 12M, 12Y, and 12K. The recording heads 12C, 12M, 12Y, and 12K are arranged above the conveyor belt 5 in the stated order from upstream to downstream in terms of the conveyance direction of the non-absorbent recording medium sheet M. Each of the recording heads 12C to 12K is supported at a height where the distance to the upper surface of the conveyor belt 5 is a predetermined length. The recording heads 12C to 12K perform image formation on the non-absorbent recording medium sheet M conveyed on the conveyor belt 5. The recording heads 12C to 12K accommodate four different color inks (cyan ink, magenta ink, yellow ink, and black ink). Ejection of the color inks from the respective recording heads 12C to 12K forms a color image on the non-absorbent recording medium sheet M.

The drying section 13 blows hot air toward the non-absorbent recording medium sheet M conveyed on the conveyor belt 5 to dry the non-absorbent recording medium sheet M after image formation. The drying temperature in the drying section 13 is at least the glass transition temperature of each of the first resin and the second resin and no greater than 135° C. The drying time in the drying section 13 is at least 3 seconds and no greater than 125 seconds. Note that the drying time is a time period for which the non-absorbent recording medium sheet M passes below the drying section 13. The drying time can be calculated by dividing the width of the drying section 13 in the conveyance direction by the conveyance speed of the non-absorbent recording medium sheet M.

One example of the inkjet recording apparatus of the present disclosure has been described so far. However, the inkjet recording apparatus of the present disclosure is not limited to that illustrated in the FIGURE.

With reference to the FIGURE, the inkjet recording apparatus 100 is described as an example including four recording heads 12C to 12K corresponding to the four inks. However, the number of the recording heads included in the inkjet recording apparatus of the present disclosure is not limited as long as it is at least 2, and can be at least 2 and no greater than 10, preferably at least 3 and no greater than 5.

The inkjet recording apparatus 100 ejects inks in four colors of cyan, magenta, yellow, and black in the stated order. However, the type, combination, and ejection order of the inks are not limited thereto.

The drying section included in the inkjet recording apparatus of the present disclosure may be a heater. In this case, the drying section is provided below the conveyor belt, for example.

In addition, the inkjet recording apparatus of the present disclosure may be a multifunction peripheral having functions of a scanner, a copier, a printer, and a facsimile.

EXAMPLES

The following describes examples of the present disclosure. However, the present disclosure is not limited to the following examples.

[Major Axis Length/Minor Axis Length Ratio]

The major axis length/minor axis length ratio of particles was measured using a transmission electron microscope (TEM, "JEM-2000FX", product of JEOL Ltd.). In photographing, the accelerating voltage was set to 80 kV and the magnification was set to 30,000×. In the photographing, the major axis length and the minor axis length of each of 10 particles randomly selected from the particles in a field of view were measured. Next, the arithmetic mean (average major axis length) of the major axis lengths of the measured 10 particles and the arithmetic mean (average minor axis length) of the minor axis lengths thereof were calculated. The value obtained by dividing the average major axis length by the average minor axis length was then used as a major axis length/minor axis length ratio of the measured particles present in the field of view. The measurement was performed at 10 fields of view. The arithmetic mean of the major axis length/minor axis length ratios of the particles measured at the fields of view was then taken as a measurement value of the major axis length/minor axis length ratios of the particles being a measurement target.

Note that the "major axis length" was defined as the distance between two virtual parallel lines that could sandwich a particle being the measurement target and whose distance was the maximum. The "minor axis length" was defined as the width of the measurement target as measured at the intersections of a third virtual parallel line and the particle being the measurement target. The third virtual parallel line was set at an equal distance between the two virtual parallel lines described above.

[Number Average Primary Particle Diameter]

The number average primary particle diameter of particles was calculated by analysis using image analysis software ("WINROOF", product of MITANI CORPORATION) on the photo taken by the aforementioned TEM. In the image analysis, a number average of the equivalent circle diameters of 100 randomly selected particles was calculated and the calculated values was used as a number average primary particle diameter of the particles.

[Volume Median Diameter]

The volume median diameter ($D_{50}$) of particles was calculated by measurement of the particle size distribution using a dynamic light scattering type particle size distribution analyzer ("ZETASIZER NANO ZS", product of Malvern Instruments Ltd.).

[Preparation of White Pigment Dispersion]

A mixture was obtained by mixing 50.0 parts by mass of titanium oxide particles ("MT-500HD", product of TAYCA CORPORATION, number average primary particle diameter 30 nm, major axis length/minor axis length ratio=5) as a white pigment, 14.5 parts by mass of a pigment coating resin ("SOLSPERSE (registered Japanese trademark) W100", product of Lubrizol Japan Limited, polyether resin), and 41.3 parts by mass of water. Dispersion treatment was performed on the resulting mixture for 60 minutes using a bead mill ("RESEARCH LABO", product of Shinmaru Enterprises Corporation). In the dispersion treatment, zirconia beads with a diameter of 1.0 mm were loaded into a vessel of the bead mill to give the loading rate 70% by volume. The treatment speed in the dispersion treatment was set to 8 m/sec. Thus, a white pigment dispersion (volume median diameter of titanium oxide particles: 30 nm, titanium oxide particle concentration: 50% by mass) was prepared.

[Preparation of Binder Resin Particle Dispersions]

Binder resin particle dispersions (UR-A) to (UR-D) used for ink preparation were shown below in Table 1. Note that the binder resin particle dispersions (UR-A) to (UR-D) each were a urethane resin particle dispersion available at DKS Co. Ltd. The binder resin particle dispersions (UR-A) to (UR-D) contained resin particles (UR-a) to (UR-d), respectively. In Table 1 below, "(R)" refers to registered Japanese trademark. "Particle diameter" refers to the number average primary particle diameter. "Concentration" refers to the concentration of corresponding resin particles.

TABLE 1

| | Tradename | Resin particles | Glass transition temperature [° C.] | Particle diameter [nm] | Concentration [% by mass] |
|---|---|---|---|---|---|
| UR-A | SUPERFLEX (R) 170 | Resin particles (UR-a) | 75 | 10 | 33 |
| UR-B | SUPERFLEX (R) 820 | Resin particles (UR-b) | 46 | 30 | 30 |
| UR-C | SUPERFLEX (R) 130 | Resin particles (UR-c) | 101 | 30 | 35 |
| UR-D | SUPERFLEX (R]) 150 | Resin particles (UR-d) | 37 | 30 | 30 |

[Preparation of Cyan Pigment Dispersion]

A cyan pigment dispersion was prepared for use in cyan ink preparation. The components contained in the cyan pigment dispersion and their amounts are shown below in Table 2.

TABLE 2

| | | Cyan pigment dispersion |
|---|---|---|
| Percentage content [% by mass] | Water | 80 |
| | Resin A-Na | 5 |
| | Cyan pigment | 15 |
| | Total | 100 |

In Table 2, "Resin A-Na" refers to a resin A (pigment coating resin) neutralized with sodium hydroxide (NaOH). "Cyan pigment" refers to "HELIOGEN (registered Japanese trademark) BLUE D7088" produced by BASF Corporation.

[Preparation of Resin A]

A resin A for obtaining the "Resin A-Na" in Table 2 was prepared by the following method. In detail, a stirrer, a nitrogen inlet tube, a condenser, and a dropping funnel were set up in a four-necked flask. Next, 100 parts by mass of isopropyl alcohol and 300 parts by mass of methyl ethyl ketone were charged into the flask. Heating and refluxing were performed at 70° C. while bubbling nitrogen into the flask contents.

Next, a solution L1 was prepared. In detail, 40.0 parts by mass of styrene, 10.0 parts by mass of methacrylic acid, 40.0 parts by mass of methyl methacrylate, 10.0 parts by mass of butyl acrylate, and 0.4 parts by mass of azobisisobutyronitrile (AIBN, polymerization initiator) were mixed to obtain a solution L1 being a monomer solution. While the flask contents were heated and refluxed at 70° C., the solution L1 was dripped into the flask over 2 hours. After the dripping, the flask contents were heated and refluxed at 70° C. for additional 6 hours.

Next, a solution L2 was prepared. In detail, 0.2 parts by mass of AIBN and 150.0 parts by mass of methyl ethyl ketone were mixed to obtain a solution L2. The solution L2 was dripped into the flask over 15 minutes. After the dripping, the flask contents were heated and refluxed at 70°

C. for additional 5 hours. In the manner described above, a resin A (styrene-(meth)acrylic resin) was obtained. The resulting resin A had a mass average molecular weight (Mw) of 20,000 and an acid value of 100 mgKOH/g.

Here, the mass average molecular weight Mw of the resin A was measured under the following conditions using a gel filtration chromatography ("HLC-8020GPC", product of Tosoh Corporation).

Column: "TSKGEL SUPER MULTIPORE HZ-H" produced by Tosoh Corporation (semi-micro column with 4.6 mm I.D.×15 cm)
Number of columns: 3
Eluent: tetrahydrofuran
Flow rate: 0.35 mL/min
Sample injection amount: 10 μL
Sample temperature: 40° C.
Detector: IR detector A calibration curve was plotted using n-propylbenzene and seven TSKgel standard polystyrenes selected from Tosoh Corporation, F-40, F-20, F-4, F-1, A-5000, A-2500, and A-1000.

The acid value of the resin A was measured by a method in accordance with "Japanese Industrial Standards (JIS) K0070-1992 (Test methods for acid value, saponification value, ester value, iodine value, hydroxyl value and unsaponifiable matter of chemical products)".

(Dispersion Treatment)

A sodium hydroxide aqueous solution with an amount necessary for neutralization of the resin A was added to the resin A while the resin A was heated at 70° C. using a hot bath. More specifically, an aqueous solution of sodium hydroxide with a mass giving 1.1 times the neutralization equivalent was added to the resin A. Thus, an aqueous solution of the resin A (resin A-Na) neutralized with sodium hydroxide was obtained. The pH of the aqueous solution of the resin A-Na was 8.

To achieve the amounts shown in Table 2, 5 parts by mass of the aqueous solution containing the resin A-Na and 15 parts by mass of C.I. Pigment Blue 15:3 were placed in the vessel of a media-type disperser ("DYNO (registered Japanese trademark) MILL", product of Willy A. Bachofen AG (WAB)), along with water, making the total mass 100 parts by mass. Note that the water was added to give the mass of the water 80 parts by mass including the mass of water contained in the sodium hydroxide aqueous solution used for neutralization of the resin A and the mass of water produced through the neutralization reaction.

Next, a medium (zirconia beads with a diameter of 1.0 mm) was loaded into the vessel to give the loading rate 70% by volume relative to the capacity of the vessel. Dispersion treatment was performed on the vessel contents using the medium disperser. Thus, a cyan pigment dispersion was obtained.

The cyan pigment dispersion was diluted 300 times with water to obtain a dilution. The dilution was measured using a dynamic light scattering type particle size distribution analyzer ("ZETASIZER NANO ZS", product of Malvern Instruments Ltd.) to determine the volume median diameter ($D_{50}$) of the cyan pigment particles contained in the cyan pigment dispersion. Thereafter, pigment particles with a volume median diameter in a range from 70 nm to 130 nm were confirmed to be dispersed in the cyan pigment dispersion.

[Preparation of White Inks and Cyan Inks]

White inks (W-A) to (W-E) and cyan inks (C-A) to (C-I) were prepared by the following methods.

(White Ink (W-A))

Into a beaker, 15.0 parts by mass (7.5 parts by mass in terms of the white pigment) of the white pigment dispersion, 10.0 parts by mass (3.0 parts by mass in terms of the resin particles) of the binder resin particle dispersion (UR-A), 25.0 parts by mass of propylene glycol, 8.0 parts by mass of butyl triglycol, 0.4 parts by mass of a silicone surfactant ("SILFACE (registered Japanese trademark) SAG 503A", product of Nissin Chemical Industry Co., Ltd., polyether modified siloxane compound), and water were weighted. The amount of the water added was adjusted to an amount (41.6 parts by mass in the white ink (W-A)) that gave the mass of the beaker content 100.00 parts by mass in total. The beaker contents were stirred at a rotational speed of 400 rpm using a stirrer ("THREE-ONE MOTOR BL-600", product of Shinto Scientific Co., Ltd.) to uniformly mix the beaker contents. Thus, a mixed liquid was yielded. The mixed liquid was filtered using a filter (pore size 5 μm) to remove foreign matter and coarse particles contained in the mixed liquid. Through the above, an ink (W-A) was prepared.

(White Inks (W-B) to (W-E) and Cyan Inks (C-A) to (C-I))

White inks (W-B) to (W-E) were prepared according to the same method as that for preparing the white ink (W-A) in all aspects other than that components were added to give the compositions shown below in Table 3. Cyan inks (C-A) to (C-I) were prepared according to the same method as that for preparing the white ink (W-A) in all aspects other than that components were added to give the compositions shown below in Tables 4 and 5. The surface tension of each ink is shown in addition below in Tables 3 to 5.

TABLE 3

| | | W-A | W-B | W-C | W-D | W-E |
|---|---|---|---|---|---|---|
| White pigment dispersion | Part by mass | 15.0 | 15.0 | 15.0 | 15.0 | 15.0 |
| Binder resin particles | Type | UR-a | UR-b | UR-c | UR-d | UR-a |
| | Part by mass | 3.0 | 3.0 | 3.0 | 3.0 | 3.0 |
| Propylene glycol | Part by mass | 25.0 | 25.0 | 25.0 | 25.0 | 18.0 |
| Butyl triglycol | Part by mass | 8.0 | 8.0 | 8.0 | 8.0 | 15.0 |
| Silicone surfactant | Part by mass | 0.4 | 0.4 | 0.4 | 0.4 | 0.02 |
| Water | Part by mass | | | Rest | | |
| Total amount | Part by mass | | | 100.0 | | |
| Surface tension $ST_W$ | mN/m | 23.22 | 22.87 | 23.51 | 24.12 | 32.24 |

TABLE 4

| | | C-A | C-B | C-C | C-D | C-E |
|---|---|---|---|---|---|---|
| Cyan pigment dispersion | Part by mass | 15.0 | 15.0 | 15.0 | 15.0 | 15.0 |
| Binder resin particles | Type | UR-a | UR-b | UR-a | UR-a | UR-c |
| | Part by mass | 3.0 | 3.0 | 3.0 | 3.0 | 3.0 |
| Propylene glycol | Part by mass | 25.0 | 25.0 | 25.0 | 25.0 | 25.0 |
| Butyl triglycol | Part by mass | 8.0 | 8.0 | 8.0 | 8.0 | 8.0 |
| Silicone surfactant | Part by mass | 0.1 | 0.1 | 0.2 | 0.015 | 0.1 |
| Water | Part by mass | | | Rest | | |
| Total amount | Part by mass | | | 100.0 | | |
| Surface tension $ST_C$ | mN/m | 24.81 | 24.59 | 23.82 | 33.16 | 25.03 |

TABLE 5

| | | C-F | C-G | C-H | C-I |
|---|---|---|---|---|---|
| Cyan pigment dispersion | Part by mass | 15.0 | 15.0 | 15.0 | 15.0 |
| Binder resin particles | Type | UR-d | UR-a | UR-a | UR-a |
| | Part by mass | 3.0 | 3.0 | 3.0 | 3.0 |
| Propylene glycol | Part by mass | 25.0 | 25.0 | 25.0 | 18.0 |
| Butyl triglycol | Part by mass | 8.0 | 8.0 | 8.0 | 15.0 |
| Silicone surfactant | Part by mass | 0.1 | 0.3 | 0.01 | 0.015 |
| Water | Part by mass | | Rest | | |
| Total amount | Part by mass | | 100.0 | | |
| Surface tension $ST_C$ | mN/m | 25.03 | 23.67 | 34.15 | 33.01 |

<Evaluation>

Image formation methods of Examples 1 to 8 and Comparative Examples 1 to 10 were carried out by the following procedure. Thereafter, color ink pinning, image adhesion to a recording medium, and image gloss were evaluated. Each evaluation was performed at a temperature of 25° C. and a relative humidity of 50% unless otherwise stated. The evaluation results are shown below in Tables 6 and 7.

[Evaluation Apparatus]

As an evaluation apparatus, an inkjet recording apparatus (prototype of KYOCERA Document Solutions Japan Inc.) was used that included a plurality of lineheads and a conveyance section. The lineheads were set to an application voltage of 21 V, a drive frequency of 18 kHz, an ejected droplet amount of 3 pL, a head temperature of 32° C., a resolution of 600 dpi, and a pre-ejection flushing count of 1000 times. Any of the white inks shown below in Tables 6 and 7 was loaded into one of the lineheads of the evaluation apparatus. This linehead was used as a white linehead. Any of the cyan inks shown below in Tables 6 and 7 was loaded into another one of the lineheads located downstream of the white linehead in terms of a conveyance direction of a recording medium sheet. This linehead was used as a recording head. As recording medium sheets, PET sheets (“LUMIRROR (registered Japanese trademark) S10 #50”, product of Toray Industries, Inc., polyester film) were used. The PET sheets were non-absorbent recording medium sheets.

[Adhesion]

The white ink was ejected onto a recording medium sheet using the evaluation apparatus to print a white solid image (printing rate 100%) on the recording medium sheet (white ink application process). Thereafter, the cyan ink was ejected onto the white solid image using the evaluation apparatus to print a cyan solid image (printing rate 100%) on the recording medium sheet in a superposed manner (image formation process). Thereafter, the recording medium sheet was dried using a dryer (drying process). The drying conditions were set as shown below in Tables 6 and 7. The resulting recording medium sheet was used as an evaluation sheet. Using a cutter, 11 vertical and horizontal incisions were created at 10 mm intervals, forming a grid pattern (checkerboard pattern) on the solid image on the evaluation sheet. This resulted in formation of 100 square cells, each with a side length of 10 mm. Adhesive tape (“CELLOTAPE (registered Japanese trademark) CT-18S”, product of Nichiban Co., Ltd.) was attached to the image with the incisions, and peeled off therefrom at an angle of approximately 60 degrees. The adhesive tape peeling was performed at a speed at which the time from the peeling start to the peeling end was 1 second. After the adhesive tape peeling, the peeled surface of the evaluation sheet was observed to count the number of peeled square cells. Adhesion of the formed image to the recording medium sheet was evaluated according to the following criteria.

(Criteria of Adhesion)

A (good): the number of peeled cells of at least 0 and less than 5

B (poor): the number of peeled cells of 5 or more

[Color Ink Pinning]

In evaluation of color ink pinning, the surface temperature of the conveyance section of the evaluation apparatus was set to 40° C. and the conveyance speed of the conveyance section was set to 30 m/min. The white ink was ejected onto a recording medium sheet using the evaluation apparatus to print a white solid image (printing rate 100%) on the recording medium sheet (white ink application process). Thereafter, the cyan ink was ejected onto the white solid image using the evaluation apparatus to print a striped pattern of a plurality of thin lines with a line width of 1 dot in a superposed manner (image formation process). In the striped pattern printing, the intervals of the thin lines was set to 3 pixels (1-dot-on 3-dot-off pattern). Thereafter, the recording medium sheet was dried using a dryer (drying process). The drying conditions were set as shown below in Tables 6 and 7. An image of the formed striped pattern was photographed using an optical microscope to obtain an evaluation image. Using an analysis tool, an average line width was determined for 14 randomly selected fine lines of the fine lines included in the evaluation image. Color ink pinning was evaluated according to the following criteria.

(Criteria of Color Ink Pinning)

A (good): average line width of less than 95 μm

B (poor): average line width of 95 μm or more or fine lines being unclear and unmeasurable (ND)

[Gloss]

In gloss evaluation, the recording medium sheet with the striped pattern printed thereon, which was prepared in the pinning evaluation, was used as an evaluation sheet. The glossiness of the evaluation sheet was measured using a gloss meter (product of Elcometer). The measurement was performed at 3 randomly selected locations at a measurement angle of 60 degrees. The average of the 3 measurement values thus measured was used as an average glossiness of the evaluation sheet. Gloss was evaluated according to the following criteria.

(Criteria of Gloss)

A (good): average glossiness of at least 60

B (poor): average glossiness of less than 60 the drying process was at least 3 seconds and no greater than 125 seconds. Each of the image formation methods of Examples 1 to 8 was rated as good in color ink pinning, gloss, and image adhesion to the recording medium sheet.

By contrast, in the image formation methods of Comparative Examples 1 and 2, the binder resin particles contained

TABLE 6

| | | Example | | | | | | | |
|---|---|---|---|---|---|---|---|---|---|
| | | 1 | 2 | 3 | 4 | 5 | 6 | 7 | 8 |
| White ink | Type | W-A | W-B | W-A | W-A | W-A | W-A | W-A | W-E |
| | Resin particles | UR-a | UR-b | UR-a | UR-a | UR-a | UR-a | UR-a | UR-a |
| | $ST_W$ [mN/m] | 23.22 | 22.87 | 23.22 | 23.22 | 23.22 | 23.22 | 23.22 | 32.24 |
| Cyan ink | Type | C-A | C-B | C-C | C-D | C-A | C-A | C-A | C-I |
| | Resin particles | UR-a | UR-b | UR-a | UR-a | UR-a | UR-a | UR-a | UR-a |
| | $ST_C$ [mN/m] | 24.81 | 24.59 | 23.82 | 33.16 | 24.81 | 24.81 | 24.81 | 33.01 |
| Drying conditions | Time [sec] | 5 | 5 | 5 | 5 | 3 | 120 | 5 | 5 |
| | Temperature [° C.] | 80 | 80 | 80 | 80 | 80 | 80 | 130 | 80 |
| Adhesion | Number of peeled cells | 1 | 3 | 3 | 2 | 4 | 0 | 0 | 0 |
| | Rating | A | A | A | A | A | A | A | A |
| Pinning | Line width [μm] | 82.9 | 75.9 | 94.7 | 52.8 | 81.1 | 82.8 | 82.6 | 65.4 |
| | Rating | A | A | A | A | A | A | A | A |
| Gloss | Glossiness | 63.4 | 82.5 | 69.5 | 62.9 | 61.4 | 65.0 | 71.4 | 64.4 |
| | rating | A | A | A | A | A | A | A | A |

TABLE 7

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| White ink | Type | W-A | W-B | W-C | W-D | W-A | W-A | W-A | W-A | W-A | W-A |
| | Resin particles | UR-a | UR-b | UR-c | UR-d | UR-a | UR-a | UR-a | UR-a | UR-a | UR-a |
| | $ST_W$ [mN/m] | 23.22 | 22.87 | 23.51 | 24.12 | 23.22 | 23.22 | 23.22 | 23.22 | 23.22 | 23.22 |
| Cyan ink | Type | C-B | C-A | C-E | C-F | C-G | C-H | C-A | C-A | C-A | C-A |
| | Resin particles | UR-b | UR-a | UR-c | UR-d | UR-a | UR-a | UR-a | UR-a | UR-a | UR-a |
| | $ST_C$ [mN/m] | 24.59 | 24.81 | 25.03 | 25.03 | 23.67 | 34.15 | 24.81 | 24.81 | 24.81 | 24.81 |
| Drying conditions | Time [sec] | 5 | 5 | 5 | 5 | 5 | 5 | 2 | 130 | 5 | 5 |
| | Temperature [° C.] | 80 | 80 | 80 | 80 | 80 | 80 | 80 | 80 | 140 | 60 |
| Adhesion | Number of peeled cells | 8 | 7 | 18 | 0 | 1 | 3 | 5 | 0 | 0 | 6 |
| | Rating | B | B | B | A | A | A | B | A | A | B |
| Pinning | Line width [μm] | 80.2 | 83.5 | 79.1 | ND | 95.3 | ND | 81.8 | ND | ND | 82.2 |
| | Rating | A | A | A | B | B | B | A | B | B | A |
| Gloss | Glossiness | 71.8 | 76.6 | 48.7 | 82.1 | 63.6 | 65.1 | 57.3 | 45.3 | 27.5 | 58.8 |
| | rating | A | A | B | A | A | A | B | B | B | B |

As shown in Tables 1 to 7, the image formation method of Examples 1 to 8 each included: a white ink application process of applying a white ink onto an image formation area of a non-absorbent recording medium; an image formation process of performing image formation with a color ink on the image formation area of the non-absorbent recording medium; and a drying process of drying the white ink and the color ink. The white ink contained a white pigment, a first aqueous medium, and first binder resin particles containing a first resin. The color ink contained a color pigment, a second aqueous medium, and second binder resin particles containing a second resin. Both the first binder resin particles and the second binder resin particles included identical resin particles. The first resin and the second resin each had a glass transition temperature of at least 40° C. and no greater than 80° C. The color ink had a surface tension $ST_C$ greater than the surface tension $ST_W$ of the white ink. The difference between the surface tension $ST_C$ of the color ink and the surface tension $ST_W$ of the white ink was at least 0.5 mN/m and no greater than 10.0 mN/m. The drying temperature in the drying process was at least the glass transition temperature of each of the first resin and the second resin and no greater than 135° C. The drying time in in the white ink and the binder resin particles contained in the cyan ink were different from each other. As a result, in the image formation methods of Comparative Examples 1 and 2, inter-layer adhesion between the underlying layer and the image layer was insufficient, resulting in poor adhesion of the formed image.

In the image formation method of Comparative Example 3, the resins (first resin and second resin) contained in the binder resin particles of the white ink and the cyan ink each had a glass transition temperature of greater than 80° C. Also, in the image formation method of Comparative Example 3, the drying temperature in the drying process was lower than the glass transition temperatures of each of the first resin and the second resin. As a result, in the image formation method of Comparative Example 3, the binder resin particles contained in the white ink and the cyan ink were insufficiently softened in the drying process, leading to poor adhesion and gloss of the formed image.

In the image formation method of Comparative Example 4, the resins (first resin and second resin) contained in the binder resin particles of the white ink and the cyan ink each had a glass transition temperature of less than 40° C. Typically, binder resin particles with an excessively low glass transition temperature readily agglomerate in ink storage or during use, leading to nozzle clogging. As a result, it was difficult to form thin lines with the cyan ink by the image formation method of Comparative Example 4, so the method was rated as poor in color ink pinning.

In the image formation method of Comparative Example 5, the difference between the surface tension $ST_C$ of the cyan ink and the surface tension $ST_W$ of the white ink was less than 0.5 mN/m. In the image formation method of Comparative Example 5, the cyan ink contained in the image layer was readily assimilated into the underlying layer. As a result, the method was rated as poor in color ink pinning.

In the image formation method of Comparative Example 6, the difference between the surface tension $ST_C$ of the cyan ink and the surface tension $ST_W$ of the white ink was greater than 10.0 mN/m. In the image formation method of Comparative Example 6, the white ink contained in the underlying layer was readily assimilated into the image layer. As a result, the method was rated as poor in color ink pinning.

In the image formation method of Comparative Example 7, the drying time was less than 3 seconds. The image formation method of Comparative Example 7 was rated as poor in gloss and adhesion of the formed image to the recording medium sheet because of insufficient drying time in the drying process.

In the image formation method of Comparative Example 8, the drying time was greater than 130 seconds (i.e., greater than 125 seconds). In the image formation method of Comparative Example 9, the drying temperature was greater than 140° C. (i.e., greater than 135° C.). As a result of excessive drying time or drying temperature, the recording medium sheet was warped into a wavy shape in the image formation methods of Comparative Examples 8 and 9. Therefore, the methods were rated as poor in color ink pinning and gloss.

In the image formation method of Comparative Example 10, the drying temperature was less than the glass transition temperature (75° C.) of each of the first resin and the second resin. The image formation method of Comparative Example 10 was rated as poor in adhesion of the formed image to the recording medium sheet due to deficiency in drying temperature in the drying process.

What is claimed is:

1. An image formation method comprising:
   - applying a white ink onto an image formation area of a non-absorbent recording medium;
   - performing image formation with a color ink on the image formation area of the non-absorbent recording medium; and
   - drying the white ink and the color ink, wherein
   - the white ink contains a white pigment, a first aqueous medium, and first binder resin particles containing a first resin,
   - the color ink contains a color pigment, a second aqueous medium, and second binder resin particles containing a second resin,
   - both the first binder resin particles and the second binder resin particles include identical resin particles,
   - the first resin and the second resin each have a glass transition temperature of at least 40° C. and no greater than 80° C.,
   - the color ink has a surface tension $ST_C$ greater than a surface tension $ST_W$ of the white ink,
   - a difference between the surface tension $ST_C$ of the color ink and the surface tension $ST_W$ of the white ink is at least 0.5 mN/m and no greater than 10.0 mN/m,
   - a drying temperature in the drying is at least the glass transition temperature of each of the first resin and the second resin and no greater than 135° C.,
   - the drying time in the drying is at least 3 seconds and no greater than 125 seconds, and
   - the color ink and the white ink contain the same surfactant.

2. The image formation method according to claim 1, wherein
   - an interval from completion of the applying a white ink to completion of the performing image formation is no greater than 10 seconds.

3. The image formation method according to claim 1, wherein
   - the image formation method is used for front printing.

4. The image formation method according to claim 1, wherein
   - each of the first resin and the second resin is urethane resin.

5. The image formation method according to claim 1, wherein
   - in the applying a white ink, the white ink is applied onto the image formation area of the non-absorbent recording medium by ink jetting, and
   - in the performing image formation, the image formation is performed with the color ink on the image formation area of the non-absorbent recording medium by ink jetting.

6. The image formation method according to claim 1, wherein
   - the surface tension $ST_C$ of the color ink is at least 23.00 mN/m and no greater than 35.00 mN/m, and
   - the surface tension $ST_W$ of the white ink is at least 20.00 mN/m and no greater than 24.00 mN/m.

7. An inkjet recording apparatus comprising:
   - a conveyance section that conveys a non-absorbent recording medium;
   - lineheads that perform image formation on the non-absorbent recording medium; and
   - a drying section that dries the non-absorbent recording medium after the image formation, wherein
   - the lineheads include:
     - a white ink head that ejects a white ink onto an image formation area of the non-absorbent recording medium; and
     - a recording head that is located downstream of the white ink head in terms of a conveyance direction of the non-absorbent recording medium and that performs the image formation with a color ink on the image formation area of the non-absorbent recording medium,
   - the white ink contains a white pigment, a first aqueous medium, and first binder resin particles containing a first resin,
   - the color ink contains a color pigment, a second aqueous medium, and second binder resin particles containing a second resin,
   - both the first binder resin particles and the second binder resin particles include identical resin particles,
   - the first resin and the second resin each have a glass transition temperature of at least 40° C. and no greater than 80° C.,
   - the color ink has a surface tension $ST_C$ greater than a surface tension $ST_W$ of the white ink,
   - a difference between the surface tension $ST_C$ of the color ink and the surface tension $ST_W$ of the white ink is at least 0.5 mN/m and no greater than 10.0 mN/m, a drying temperature in the drying section is at least the glass transition temperature of each of the first resin and the second resin and no greater than 135° C., a drying time in the drying section is at least 3 seconds and no greater than 125 seconds, and the color ink and the white ink contain the same surfactant.

* * * * *